United States Patent [19]
Kittredge

[11] 3,714,446
[45] Jan. 30, 1973

[54] ELECTRO-OPTICAL SIGNAL TRANSLATION

[76] Inventor: Edward D. Kittredge, 43 Orange Street, Nashua, N.H. 03060

[22] Filed: March 19, 1970

[21] Appl. No.: 20,921

[52] U.S. Cl..................250/219 D, 178/30, 250/237
[51] Int. Cl..............................G01n 21/30
[58] Field of Search..........197/1, 1.5, 5; 250/219 CR, 250/219 D, 219 DD, 237; 346/104; 235/61.11 E, 61.9, 61.6; 250/229; 340/189, 190; 178/30

[56] References Cited

UNITED STATES PATENTS

| | | | |
|---|---|---|---|
| 3,278,683 | 9/1966 | Ashby | 178/30 |
| 3,214,595 | 10/1965 | Johnson | 250/219 D |
| 3,549,895 | 11/1970 | Sidorsky | 250/219 D |
| 2,930,847 | 3/1960 | Metzger | 178/30 |
| 3,299,418 | 1/1967 | Treseder | 178/30 |
| 3,479,651 | 11/1969 | Bowers | 250/219 D |
| 3,530,442 | 9/1970 | Collier | 250/219 D |
| 3,458,655 | 7/1969 | Thourson | 178/30 |
| 3,422,444 | 1/1969 | Stauffer | 178/30 |
| 3,191,157 | 5/1965 | Parker | 250/219 D |
| 3,444,319 | 5/1969 | Artzt | 178/30 |

Primary Examiner—Archie R. Borchelt
Assistant Examiner—D. C. Nelms
Attorney—Charles Hieken

[57] ABSTRACT

Electro-optical signal translation means and methods are provided for use in printing and other applications. An electro-optical signal translator has a font carrying images each identified by a set of orthogonal coordinates. Means define radiant energy beam paths and a plurality of radiant energy sensitive means are operatively positioned for defining a second orthogonal coordinate. The first means preferably comprises a plurality of light sources operatively associated with a plurality of light pipes for passing light beams through the font and onto a deflecting means for deflecting light beams to photoelectric cells for defining the second orthogonal coordinate and thus selecting a particular image carried by the font.

28 Claims, 13 Drawing Figures

INVENTOR
EDWARD D. KITTREDGE
BY
Wolf, Greenfield, Hieken & Sacks
ATTORNEYS

INVENTOR
EDWARD D. KITTREDGE

INVENTOR
EDWARD D. KITTREDGE
BY
Wolf, Greenfield Hieken + Sacks
ATTORNEYS

ELECTRO-OPTICAL SIGNAL TRANSLATION

BACKGROUND OF THE INVENTION

A variety of printing devices are known most of which use mechanical or electrical translation means or a combination of electrical and mechanical translation means to select a character to be printed. Such devices are often expensive, complex, bulky and/or limited in speed of operation. In some cases, the time required for selection of a particular character to be printed is excessively long. As used in this disclosure, the term "printing" refers to any means or method of recording an image on a substrate and includes for example reproduction as by the use of a typewriter.

It is an object of this invention to provide electro-optical signal translation means and methods which permit versatility in image selection.

Another object of this invention is to provide electro-optical signal translation means and methods in accordance with the preceding object which permit extremely high speed operation.

Still another object of this invention is to provide a signal translation means in accordance with the preceding objects which is light in weight and small in size.

A further object of this invention is to provide electro-optical signal translation means and methods for enabling simultaneous transmission of codes, instructions and other images such as alpha-numeric characters.

SUMMARY OF THE INVENTION

An electro-optical signal translator in accordance with this invention comprises a font of images each identified by a unique set of orthogonal coordinates. Means define a plurality of radiant energy beam paths each associated with respective first ones of said orthogonal coordinates intercepting said font means. Means define a plurality of radiant energy sensitive means each associated with respective second ones of said orthogonal coordinates and means are provided for selecting one of said paths and one of said radiant energy sensitive means to select that one of said images identified by the set of coordinates corresponding to the selected path and radiant energy sensitive means. Preferably deflecting means are used for deflecting said radiant energy beam paths to activate said radiant energy sensitive means. In the preferred embodiment, timing means are incorporated for obtaining predetermined timed responses from the radiant energy sensitive means, and the timed responses are preferably coordinated with a print-out device.

Preferably the radiant energy beams are light beams obtained from a plurality of rows each containing a plurality of light pipes. Preferably each row of light pipes is connected with an individual light emitter acting as a light source and said radiant energy sensitive means is a photoelectric conversion means having sets of photoelectric cells. The timing means is preferably a scan band run in synchronism with movement of print-out heads used. In some embodiments, the light pipes can be illuminated and shutter arrangements or other light emitter configurations used such as light emitting diodes.

According to the invention, a novel font for use in a stack arrangement in the electro-optical signal translators of this invention has an opaque planar member defining a plurality of image-carrying sections arranged on orthogonal coordinates. The images are aligned in rows with at least two of the rows being separated by a light transparent portion of the planar member so that when two fonts are stacked either one can be moved to an operative position by shifting its image-carrying sections to lie adjacent the light transparent portion of the other font. Preferably each section carries light transparent letters or numbers in combination with a light transparent code indication. In an alternate embodiment of the font, the light transparent portion comprises a plurality of transparent portions in each image-carrying section rather than between rows. The light transparent sections can for example, be parallel slots with portions of the image positioned between the slots.

A novel print-out mechanism useful with the electro-optical signal translator of this invention has two print-out heads mounted for movement in a straight line with means for moving the heads toward and away from each other. Means actuate one of the print-out heads to print while the other print-out head is not printing and vice versa.

According to the method of this invention, an image is selected from a font carrying the images with each image identified by a set of orthogonal coordinates. Radiant energy beams are passed through the font to select a first orthogonal coordinate from the font and radiant energy sensitive means are used to define a second orthogonal coordinate thereby selecting a particular predetermined image from the font.

It is a feature of this invention that an electro-optical signal translator can be made with few parts at small cost and with small size. Yet, the signal translator permits image selection rapidly at speeds at least as high as 1,000 words per minute. A large variety of characters are available for selection in short time periods. The image means is preferably made interchangeable with other image means, as can easily be done, to permit use of a single instrument for printing any language and/or groups of numbers. Codes can be printed simultaneously with print-out of characters such as letters or numbers. Silent operation printers of small size can be made in accordance with the present invention. The signal translators of this invention have few or no mechanical moving parts thus minimizing maintenance and wear problems. An electro-optical signal translator in accordance with this invention may receive input data asynchronously at any rate up to its maximum rate, which may be thousands of words per minute.

Preferably the electro-optical signal translators of this invention are used in conjunction with keyboard devices such as typewriter keyboard selectors and print-out devices for utilizing the electrical response obtained to print out characters as on a typewriter roll. The electro-optical signal translator can also be used for office reproduction apparatus, editorial machines, computer read-outs and the like. Suitable connection can be made to obtain direct visual display as on television screens or to obtain magnetic tape recordings, etc.

BRIEF DESCRIPTION OF THE DRAWINGS

The above and other objects, features and advantages of the present invention will be more clearly understood from the following description when read in connection with the accompanying drawings in which.

DESCRIPTION OF PREFERRED EMBODIMENTS

Figure 1:
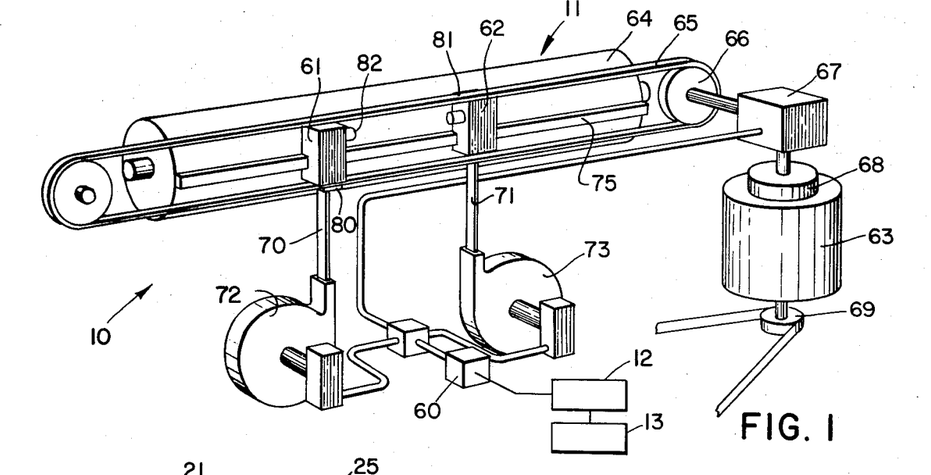
FIG. 1 is a semidiagrammatic view of a preferred embodiment of the electro-optical signal translator of this invention incorporated in a printing system.

With reference now to the drawings and more particularly FIG. 1, a printing system is generally indicated at 10 comprising a print-out device 11, an electro-optical signal translator 12 and an input signal means 13. As best shown in FIGS. 1–5, the signal translator of the preferred embodiment has a radiant energy beam producing selection 14, an aligned font 15, a scan band 16, a parabolic deflecting mirror 17 and a radiant energy sensitive section 18.

The radiant energy beam producing section 14 has a plate 20 made of an opaque material defining integral parallel upstanding walls 21. In the preferred embodiment, six parallel walls 21 are provided and each defines eight light pipes 22 with each light pipe having a first end 23 at a top surface of its wall 21 and a second end 24 extending to the bottom surface of plate 20. The light pipes are thus arranged in six rows with the light pipes of each row defining one set of orthogonal coordinates as on an X axis. The light pipes are preferably hollow channels for directing light to define the one set of coordinates.

Figures 2, 2A, 3, 4:
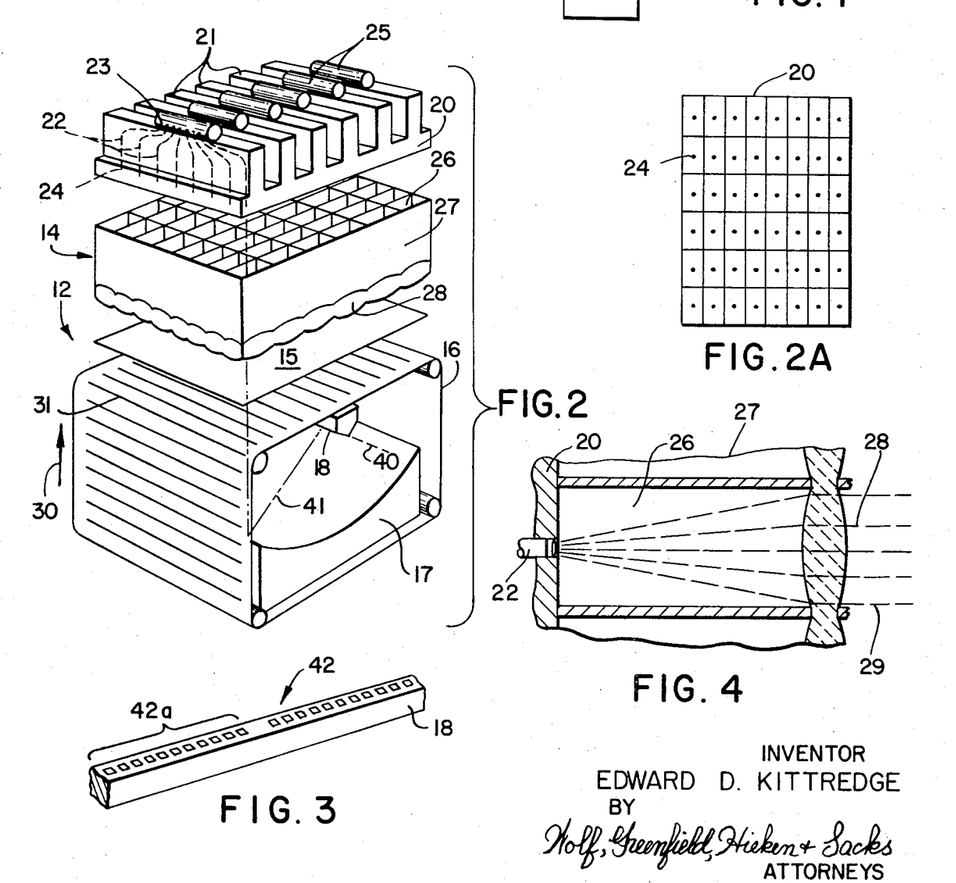
FIG. 2 is a perspective view of a preferred embodiment of the electro-optical signal translator thereof.
FIG. 2A is a bottom view of an element thereof.
FIG. 3 is an enlarged fragmentary top view of an element thereof.
FIG. 4 is a cross sectional view of elements thereof.

Radiant energy means used are preferably light emitters such as elongated argon bulbs 25 positioned adjacent the first ends 23 as best shown in FIG. 2. Other noble gas discharge lamps and the like of various shapes can be used. The light emitters can be blackened out as with the use of reflective materials to provide light only to the area of the first ends of the light pipes if desired. When a particular light emitter source 25 is activated, light will pass through the light pipes along a particular row of light pipes in one of the walls 21. Directly underlying each light pipe is a light passageway 26 formed as for example by an open ended opaque divider box 27. The divider box is positioned adjacent the lower surface of plate 20 as best seen in FIG. 4. The lower end of the divider box 27 is provided with a plurality of spherical lenses or Fresnel lenses 28 with one lens associated with each passageway 26 so that light passing from any light pipe 22 is formed into a parallel beam of light as indicated at 29 in FIG. 4.

Figure 5:
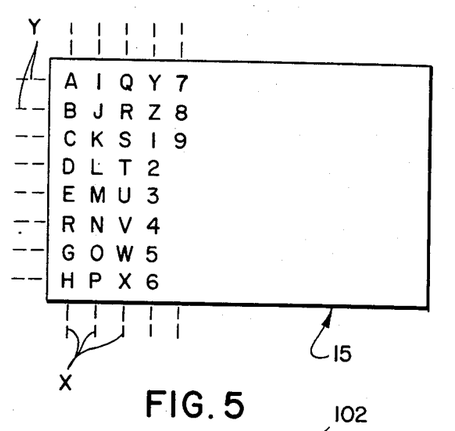
FIG. 5 is a front view of an image font thereof.

Directly underlying the series of lenses 28 is a font 15 as best shown in FIG. 5. The font 15 has a plurality of characters lying on parallel orthogonal axes such as X and Y axes, at right angles to each other as indicated. The font 15 can have letter characters or numerical characters as indicated or any other image to be transmitted. The font can be a paper card such as an IBM-type card having small holes punched in the form of each character as known in the art. Alternatively, the font can comprise any other known font means including films and the like wherein the characters permit passage of the radiant energy such as light whereas the background material about the characters are opaque and prevent passage of light. Each character is aligned with a lens 28 so as to be capable of receiving a parallel ray beam of light through it. Any conventional font holder can be used to position the font in the position shown in FIG. 2. Moreover, the font holder can be formed to permit interchangeability of fonts allowing a wide variation in the number of characters available for selection. Interchangeability of fonts permits printing in a variety of languages, codes and the like. Moreover, the number of light pipes, rows of light pipes and radiant energy sensitive means further enhances the versatility of the device enabling a large variety of images to be selected.

Underlying the font 15 is a timing device which preferably comprises an endless tape or film forming a scan band 16 of opaque material driven in the direction of arrows 30 and having a plurality of equally spaced parallel light transparent slits 31. The tape is a scan band and acts as a timing device to time the display of light beams passing therethrough on the row of photocells 42. The scan band 16 is preferably moved at a constant speed synchronized with the speed of the print-out device as will be described to permit passage of light beams 29 at predetermined timed intervals.

Within the scan band 16 is positioned a parabolic single focal line mirror or light deflector 17 having a width corresponding to at least the distance between the furthermost light pipe ends 24 of each row. The deflector 17 is capable of picking up light beams 29 from each row of light pipes 22 and deflecting all or any of said light beams to points along a line indicated at 40 illustrated by the reflected beam 41 illustrated in FIG. 2.

As best seen in the fragmentary view of FIG. 3, aligned with line 40 is a row of radiant energy sensitive means arranged parallel to the rows of light pipe ends 24. The radiant energy sensitive means are preferably a plurality of photosensitive diodes 42 as known in the art. The section 18 of the preferred embodiment carries eight sets or groups 42A of eleven photodiodes 42 in each set. Each set is aligned to receive a reflected parallel light beam from any one of the light pipes along a Y axis perpendicular to the X axis of the rows of light pipes in each wall 21. Preferably eleven photodiodes are used in each set to enable use of a print-out head as known in the art comprising eleven styli in a vertical direction. This enables use of nine styli to print a character such as a letter or number and two styli for commas or other descenders. Suitable electrical leads (not shown) interconnect the photocells with the styli preferably through an amplifier and also interconnect the photocells and light emitters with a signal input 13. Photosensitive diodes or photoelectric cells can be fabricated by thick film techniques or ceramic substrates. As is known, more than 200 photocells can be grouped in each square inch with minimum cell size being 0.040 × 0.040 with minimum conductor width and spacing at 0.015 inch. Dynamic resistance range of photocells can be greater than one million to 1. Peak spectral responses can be obtained in the range of 6,500A to 7,100A. The position of the row of photodiodes 42 is selected to lie between two parallel rows of light pipe ends 24 so as not to obstruct light beams emanating from any of the light pipes in use.

In use of the electro-optical signal selector, a conventional input device is used to actuate a desired one of the light emitters 25 and a desired segment 42A of the photocells 42 is enabled preferably simultaneously as by punching a key of a typewriter keyboard. The input causes an entire row of light pipes such as the first row on the right of FIG. 2 to be activated causing light to pass through the light pipes 22, lenses 28 of a row where the light is formed into parallel ray beams, and one row such as an X axis row of the font. The light beams 29 pass downwardly to the deflecting mirror 17 in a timed sequence by scan band 16 and from thence upwardly to the row of photocells 42. Since only one preselected segment of photocells is enabled, that segment selects the particular character along a Y axis and translates the light beam received into electrical signals corresponding to the character selected. The electrical signals from each photocell of the enabled segment are amplified and transmitted to a print-out system in timed sequence or transmitted to any other system as will be described. The motor 63 can be run at suitable intervals to actuate the print-out head movement and synchronous scan band movement whenever a letter is called for by the input.

Figure 6:
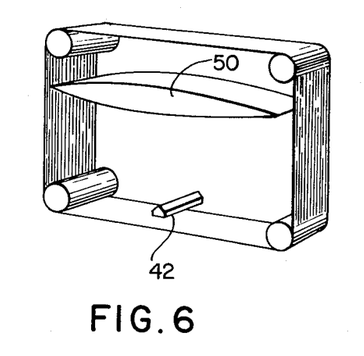
FIG. 6 is a front view of an alternate embodiment of elements thereof.

In an alternate embodiment of the signal translator, the deflecting mirror 17 is replaced by a conventional elongated lens 50 as shown in FIG. 6 with the row of photoreceptive diodes 42 underlying the lens 50 so that a selected one of the light beams reaching the lens 50 will be directed to a selected segment made up of photocells 42 in the same manner as previously described.

In still another embodiment of the invention, each light pipe 22 is provided with its own light emitter 25. The keyboard device, by conventional means known in the art is designed to actuate a single light emitter and simultaneously all of the photocells 42 are enabled. In this embodiment, only a single beam of light 29 is passed to the deflecting means 17 or 50 and from thence to a predetermined segment of photocell of the row 42. In this embodiment, the light pipe 22 can be eliminated and a light source aligned with each passageway 26. Thus, in this embodiment, the X, Y coordinates of the light beam corresponding to the X, Y coordinates desired on the font 115 are selected by the input device 13 in a known manner. Alternately, light pipes 22 can be eliminated with each passageway 26 having its own associated light source and with suitable wiring to actuate an entire row of light sources connected in series along the X axis.

The preferred print-out device shown in FIG. 1 comprises an amplifier 60, printing heads 61 and 62 and dive motor 63 for recording the character selected on a recording means such as paper (not shown) mounted on a rotating platen 64 such as a conventional typewriter roller.

The heads 61 and 62 are preferably identical and can comprise a series of styli as are known in the art to receive amplified signals from the amplifier 60 whereby the styli are actuated to print out the character selected. The heads can comprise pop styli or a variety of print-out devices such as pressure means for activating a pressure sensitive paper, optical means activated by the amplified signal to print out the character on photosensitive paper or fine wire styli to print out on electrosensitive paper and the like.

Preferably two heads 61 and 62 are used slidably mounted on a bar 75 parallel to the roller 64. The heads are interconnected with a drive band 65 driven through a pulley system 66 attached to a reversing gear 67 which is in turn driven through clutch 68 interconnected with the motor 63. Preferably the motor 63 drives both the band 65 and the scan band 16 in synchronism through a drive pulley 69. In the preferred embodiment, the heads 61 and 62 are electrically connected by torque spring wires 70 and 71 in identical windup mechanism 72 and 73 which permits movement of the heads and constant low stress on the conductors 70, 71 during movement of the heads.

The heads 61 and 62 are designed to move so that head 61 moves from the left-hand edge of the roller 64 to the center thereof and back again with the right-hand head 62 moving back to the center and reaching the center when the left-hand head reaches the center and then moving to the right-hand edge of roller 64 as the left-hand head 61 returns to the left-hand edge thereof. The left-hand head is actuated at one period of time while the right-hand head is returning and vice versa to increase speed of the device and cut down problems caused by rapid movement over long distances of the heads which problems include high forces of momentum. In order to achieve the desired movement of the heads 61 and 62, switching means are provided so that the heads may be connected with one head linked to the lower span of the belt 65 as at 80 and the other head linked to the upper span of the belt as at 81. A trip switch 82 is provided to reverse direction of the belt when the heads meet at the center of the roller and to reverse electrical input from the cells 42 from one head to the other. Alternatively, a single styli print-out head can be used along with a register. The register holds electric signals from the cells 42 when the head is returning to the left and feeds to the head during left to right movement.

The styli head or heads used can be provided with an extra stylus activated directly from the keyboard or input to underline words printed thus enabling simultaneous print-out of characters and underlining. For example, a styli head 61A is shown in FIG. 8 having an extra or 12th stylus 61B for underlining a character printed by the top eleven styli.

In all embodiments, the electro-optical signal translators are operated in a darkened condition as by the use of an opaque casing enclosing the device in order to prevent outside light from interfering with operation.

Figures 7, 7A:
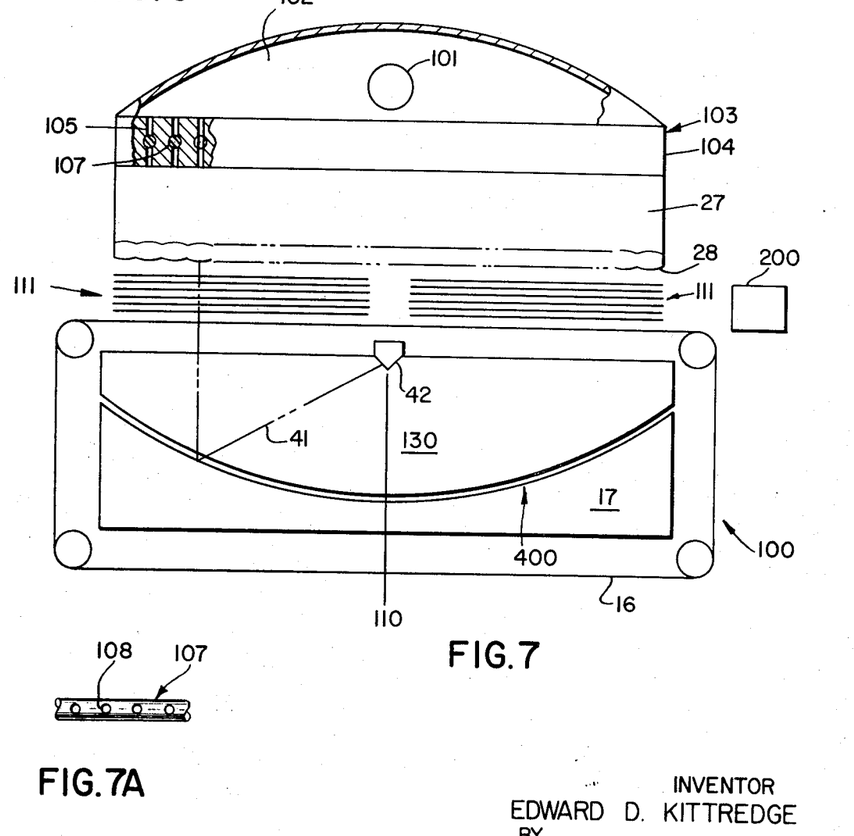
FIG. 7 is a semidiagrammatic plan view of an alternate embodiment of an electro-optical signal translator of this invention.
FIG. 7A is a top view of an element thereof.
Figure 8:
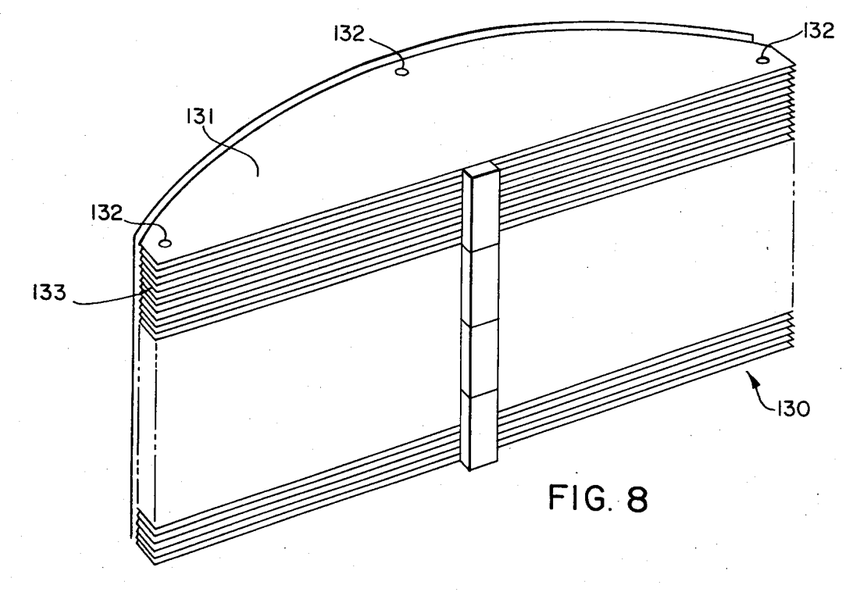
FIG. 8 is a perspective view of an element thereof.

An alternate embodiment of the electro-optical signal translator 12 is illustrated in FIGS. 7, 7A and 8 at 100 wherein parts identical to embodiment 12 are given identical numbers. In the embodiment 100, a plurality of light sources are provided along X axes with associated lenses 28 for providing parallel ray light beams which are passed through a selected font of a plurality of fonts, deflected by a mirror such as 17 onto a row of light sensitive photocell 42 as previously described.

The light sources are formed by a single light bulb or emitter 101 or a plurality of light emitters mounted in a chamber 102 designed to pass light to the entire surface of a shutter plate 103. The light in the chamber 102 is continuously illuminated during usage as in a printer device. The shutter 103 of the preferred embodiment comprises an opaque flat member 104 having a plurality of slits 105 extending therethrough and aligned on 24 parallel X axes. Preferably intermediate each through slit 105 is a cylindrical shutter rod 107 each having through light passages or ports 108 with four ports 108 aligned within the rod. The rod may be of a stiff opaque material so that rotation of the rod will alternately permit light passage through slits 105 or obstruct such passage whereby the rods acts as a shutter means. A conventional torque motor (not shown) or other driving device can be used to rotate a selected one of rods 107 to reciprocal positions allowing passage of light and to a position obstructing passage of light. Aligned with the slits 105 is the divider box 27 and lenses 28 for obtaining parallel beams of light 29 as previously described. The only difference in the embodiment 100 is that the divider box, plate 103 and lenses 28 are formed so that four parallel beams of light can be obtained along each of 12 parallel X axes (rather than eight) on either side of a central plane 110 of the device 100, and 12 parallel light beams along each of four parallel Y axes.

Instead of a single interchangeable font 15, a plurality of fonts are used in two stacks 111 on either side of plane 110 as seen in FIG. 7. The different fonts of the stacks 111 may carry different alphabets, numerical systems or other images as desired and enables greater versatility in the device 100. Only one font 111 is used in operation at any period of time. A suitable shift mechanism can be actuated by a keyboard as by example actuating a solenoid to move one font of each stack into the proper coordinates to match the light beams from the light source as desired.

Figure 9:
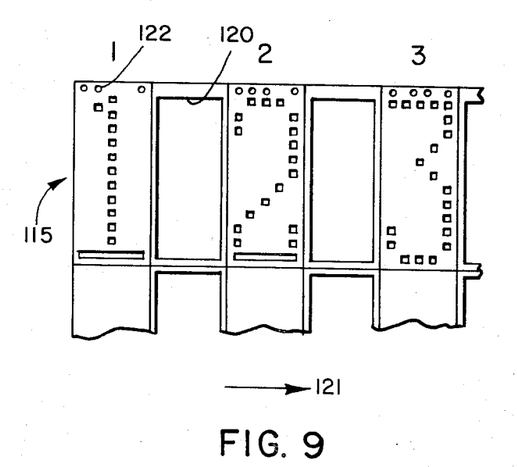
FIG. 9 is a fragmentary top view of a font thereof.

A particularly desirable font arrangement is shown in FIG. 9 wherein the font 115 is formed of a paper card such as an IBM card having four image-carrying sections or rectangles along each Y axes with twelve parallel X axes provided thus each section is defined by one of twelve X axes and one of four Y axes. Between each vertical column lying on an X axes, are a series of cutout holes or light transparent portions 120 preferably of a size at least as large as each section. When cards such as 115 are stacked, holes 120 are aligned. Movement of any one of the cards in a stack such as in the direction of arrow 121 by a distance of one column width, enables that card to align its image-carrying sections with the paths of the parallel beams of light from the light source. Reciprocal movement reverse to the direction of arrow 121 places the card back in its inoperative position in the stack. Thus, when five cards in each stack 111 are used in the embodiment 100, any one of 10 fonts can be selected by suitable actuation as of a typewriter key. Moreover, by the use of a dual stack as in embodiment 100, one card of each stack can be positioned for use simultaneously thereby increasing the characters immediately available for use by the operator.

As shown in FIG. 9 on card 115 each rectangular area identified by an XY coordinate, carries punched holes allowing light transmission through the otherwise opaque card in the form of a number or letter and in addition, carries a punched code across its upper edge. The code punched holes 122 enable simultaneous print-out of a character along with encoding. The encoding can be accomplished as by attaching an encoder unit indicated diagrammatically at 200 to one photocell of each segment 42A. Thus, as a number is translated into an electrical signal by cells of a segment 42A, the code 122 is simultaneously translated as onto a magnetic tape, visual display or other storage unit which may comprise a tape recorder such as 200. This device enables encoding along with or if no characters are used, by itself in any number of codes such as ASCII, Burroughs 44 or other codes. Permanent records of any printed material can be made simultaneously with the material by the use of system such as described or telephonic or telegraphic messages can be produced. The drive gear 69 can be used to drive a magnetic recorder capstan so that a single motor such as 63 drives the print-out, scan band and encoder device.

Figure 10:
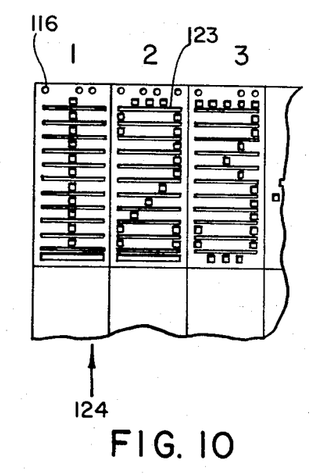
FIG. 10 is a fragmentary top view of an alternate font thereof.
Figure 11:
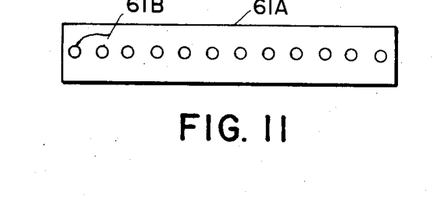
FIG. 11 is a front view of a styli head useful in connection with this invention.

In an alternate embodiment, cards 116 are used. Cards 116 are substantially identical in principle to cards 115; however, in these cards, each image-carrying rectangular section has a plurality of transparent or cut out slots 123. The data carried as by punched holes comprises the holes defining a character, numeral and/or code being interspaced with the light transparent portions or cut out slots 123. When cards such as 116 are stacked, one card can be placed in the beams of light as required by shifting of the card from the stack as in the direction of arrow 124. Reverse movement places the card back in the stack with all light passing through the slots 123. The same principle of cut outs can be used for tapes, films and the like in stacks rather than cards.

The deflector is mirror 17 as previously described which comprises a first surface parabolic lens as previously described. The mirror is located to direct all light beams passing to it to the row of photocells 42. The row of photocells 42 is arranged as previously described with respect to embodiment 12 except that only four segments 42A are used with eleven cells in each segment. Each photocell 42 is suitably wired to a stylus print-out head and the individual styli thereof as previously described, by conventional electrical wiring and to amplifier means as known in the art. Scan band 16 is provided as previously described.

In this embodiment, a baffle arrangement 130 is positioned between the scan band and the surface of the mirror 17. The baffle 130 as best shown in FIG. 8 is made up of a plurality of opaque, generally sector-shaped flat members 131 arranged parallel to each other preferably mounted on parallel support rods 132.

Each baffle member 131 acts to prevent unwanted reflection of light in a top to bottom direction as shown in FIG. 8 as may occur if the light beams are not made up of perfectly parallel light rays. Parallel spaces 133 extend from the front of the baffle to the rear opened end allowing light rays to be deflected by the mirror 17. Each space 133 is aligned with one photocell of the row of photocells 42 so that a light beam 41 as previously described is allowed to activate desired photocells. If eleven photocells are used in each of four segments, 44 spaces 133 will be provided by the baffle member 131.

In a modification of embodiment 100, a second shutter plate constructed as described with respect to shutter plate 103 is used. However, each rod 107 has 24 circular ports 108 therethrough and four rods are used. The second shutter plate is positioned directly adjacent and above plate 103 with the sets of rods of each plate perpendicular to the sets of rods of the other in planes parallel to each other and the ports 108 of each plate aligned with each other along with orthogonal coordinates of the stacks 111. In this embodiment, the input means is used to simultaneously activate a selected shutter rod of the first plate 103 and a selected shutter rod of the second shutter plate to thus define X, Y coordinates permitting a single light beam to pass to the selected image-carrying section of a properly positioned font. In this modification, all of the photocells are enabled (in condition to electrically respond) simultaneously with simultaneous activation of the shutter rods as by rotation of two selected shutter rods (one in each plate).

It should be understood that while specific embodiments of the present invention have been shown and described, many variations are possible. For example, baffles such as 130 can be used in conjunction with embodiment 12 if desired. Similarly, stacks of fonts can be used in any of the embodiments of this invention. In some cases, a shutter arrangement can be used in the embodiment of device 12 or alternately a light pipe or other light source arrangement can be used in embodiment 100. Fonts such as 115 or 116 can be used in the embodiment 12 and a suitable permanent recording take off provided as known in the art. Rather than a permanent recording take off for the code used, the coded portion of the fonts can be used to activate a telephonic or telegraphic signal or the like.

What is claimed is:

1. Apparatus for selecting an image comprising,
   font means carrying images each identified by a unique set of orthogonal coordinates,
   means defining a plurality of radiant energy beam paths each associated with respective first ones of said orthogonal coordinates intercepting said font means,
   means defining a plurality of radiant energy sensitive means each associated with respective second ones of said orthogonal coordinates,
   means for selecting one of said paths and one of said radiant energy sensitive means to select that one of said images identified by the set of coordinates corresponding to the selected path and radiant energy sensitive means,
   deflecting means for deflecting a number of said radiant energy beam paths upon a predetermined one of said radiant energy sensitive means,
   timing means for obtaining predetermined timed responses from said radiant energy sensitive means,
   said means defining a plurality of radiant energy beam paths comprising a plurality of light sources and said radiant energy sensitive means comprising a plurality of sets of photoelectric cells,
   said means defining a plurality of radiant energy beam paths comprising means for forming light from said light sources into parallel rays,
   and said timing means comprising scan band means interposed in said beam paths for timing passage of radiant energy along said paths to said deflecting means.

2. An apparatus in accordance with claim 1 wherein said timing means comprises a moving scan band defining opaque and light transmitting areas, and print-out means for printing said selected one image,
   said print-out means comprising a plurality of styli mounted for synchronous movement with said scan band.

3. Apparatus in accordance with claim 2 wherein one of said plurality of styli is positioned to underline images printed by said print-out means,
   and means for actuating said one stylus.

4. Apparatus in accordance with claim 1 wherein said means defining a plurality of radiant energy beam paths further comprises a plurality of rows of light pipes arranged on first axes with said sets of photoelectric cells defining second axes,
   each of said plurality of light sources being aligned with a row of said light pipes whereby an entire row of light pipes is illuminated by a single light source.

5. Apparatus in accordance with claim 4 and further comprising
   said font means comprising a plurality of fonts in a stack,
   said stack being arranged to permit alignment of any one of said fonts in operative position intercepting said radiant energy beam paths.

6. Apparatus in accordance with claim 5 and further comprising input means for actuating one of said light sources simultaneously with enabling one of said sets of photoelectric cells,
   and print-out means for receiving electrical output from said sets of photoelectric cells to record said images over a time period controlled by said scan band means.

7. Apparatus in accordance with claim 6 and further comprising encoder means for receiving electrical output from one photocell in each set and encoding said output simultaneously with operation of said print-out means.

8. Apparatus in accordance with claim 6 and further comprising,
   said print-out means comprising two print-out heads,
   means for moving said print-out heads along a straight line so that said print-out heads move toward and away from each other,
   means for actuating one of said print-out heads to print while deactuating printing of the other of said print-out heads and vice versa,
   and a second font means carrying images each identified by a set of orthogonal coordinates,
   said first-mentioned and second font means being stacked,
   said images being arranged to enable movement of either font means into and out of operative relation with said radiant energy beams by reciprocal straightline movement of one font means with respect to the other over a distance less than an overall dimension of one font means.

9. Apparatus in accordance with claim 1 wherein said light sources comprise a light emitter and a plurality of shutters,
each of said shutters being arranged in alignment with a respective one of said beam paths.

10. Apparatus in accordance with claim 9 and further comprising baffle means associated with said deflecting means for preventing unwanted activation of certain of said photocells during operation of said apparatus.

11. Apparatus in accordance with claim 1 wherein said individual ones of said light sources are each aligned with a plurality of coordinates along an axis,
and individual sets of said photocells define second axes orthogonal to said first-mentioned axis.

12. Apparatus in accordance with claim 1 and further comprising baffle means associated with said deflecting means for preventing unwanted activation of certain of said photocells during operation of said apparatus.

13. Apparatus in accordance with claim 11 and further comprising baffle means associated with said deflecting means for preventing unwanted activation of certain of said photocells during operation of said apparatus.

14. An electro-optical signal translator for selecting a character by obtaining a predetermined electrical response, said translator comprising,
a plurality of rows of light passages with each passage having a first end and a second end,
said rows of light passages being operatively positioned with respect to first axes orthogonal to second axes with at least two light passages lying in each row,
a plurality of light sources positioned at said first ends of said light passages with each light source being capable of providing light to each of the light passages in its row,
lens means associated with each of said second ends to form parallel light rays from light emanating from said light passages,
font means carrying light responsive characters arranged on said first and second orthogonal axes and defining a plurality of characters each operatively associated with a predetermined light passage,
a light ray deflecting means for receiving light signals from any of said rows of light passages after said light has passed through said font means,
a row of a plurality of photoelectric means operatively arranged with respect to said light ray deflecting means whereby deflected light signals are passed to said row of photoelectric means and a preselected one thereof can be enabled to select a predetermined optical character signal along one of said second orthogonal axes and convert said optical character signal to an electrical signal corresponding to the character desired.

15. An electro-optical signal translator in accordance with claim 14 and further comprising,
means for obtaining said electrical signals corresponding to optical character signals at predetermined timed intervals.

16. An electro-optical signal translator in accordance with claim 15 wherein said light passages are light pipes.

17. An electro-optical signal translator in accordance with claim 16 wherein said plurality of light sources comprise a light emitter and a plurality of shutters.

18. An electro-optical signal translator in accordance with claim 14 wherein each of said photoelectric means comprises a plurality of photoelectric cells.

19. An electro-optical signal translator in accordance with claim 18 wherein said photoelectric cells of each photo-electric means are electrically connected with print-out styli and a selected one of said photoelectric cells of each photo-electric means is electrically connected with an encoding means.

20. An electro-optical signal translator in accordance with claim 18 and further comprising a print-out head carrying a plurality of styli each electrically interconnected with selected ones of said individual photoelectric cells,
said print-out head being mounted for movement corresponding to said timed intervals.

21. A font in accordance with claim 20 and further comprising at least two of said image-carrying sections defining a code means and a character means.

22. An electro-optical signal translator in accordance with claim 18 wherein said font means comprise a plurality of stacks of planar fonts.

23. A method of obtaining an electrical signal corresponding to an image selected from a font having images identified by orthogonal coordinates, said method comprising,
passing radiant energy beams through the font to select a first orthogonal coordinate,
and using radiant energy sensitive means to define a second orthogonal coordinate whereby a predetermined image is selected.

24. A method in accordance with the method of claim 23 wherein said radiant energy beams are light beams and said radiant energy sensitive means are aligned sets of photoelectric cells and further comprising the steps of
forming said light beams into parallel ray light beams,
said parallel ray light beams being passed through the font along a selected row of images lying on an X axis,
and deflecting said light beams to direct said light beams to said aligned sets of photoelectric cells.

25. A method in accordance with the method of claim 24 and further comprising,
passing said light beams to a scan means after passage through said font.

26. A method in accordance with the method of claim 25 and further comprising enabling only one set of photoelectric cells simultaneously with passage of said light beams whereby said only one set of photoelectric cells produces an electrical image signal corresponding to said selected image.

27. A method in accordance with the method of claim 26 wherein said parallel ray light beam are passed through said font to select a single image and all of said sets of photo-electric cells are simultaneously enabled whereby said light beams select said first and second orthogonal coordinates.

28. A method of obtaining a electrical signal corresponding to an image selected from a font having images identified by orthogonal coordinates, said method comprising, selecting a means for forming a radiant energy beam passing through a predetermined image of said font, using radiant energy sensitive means to obtain an electrical signal corresponding to said selected image, passing said radiant energy beam to a timing means for permitting activation of said radiant energy sensitive means in a predetermined time sequence, and deflecting said radiant energy beam after passage to said timing means.

* * * * *